INVENTOR
ROBERT A. PLUMBO

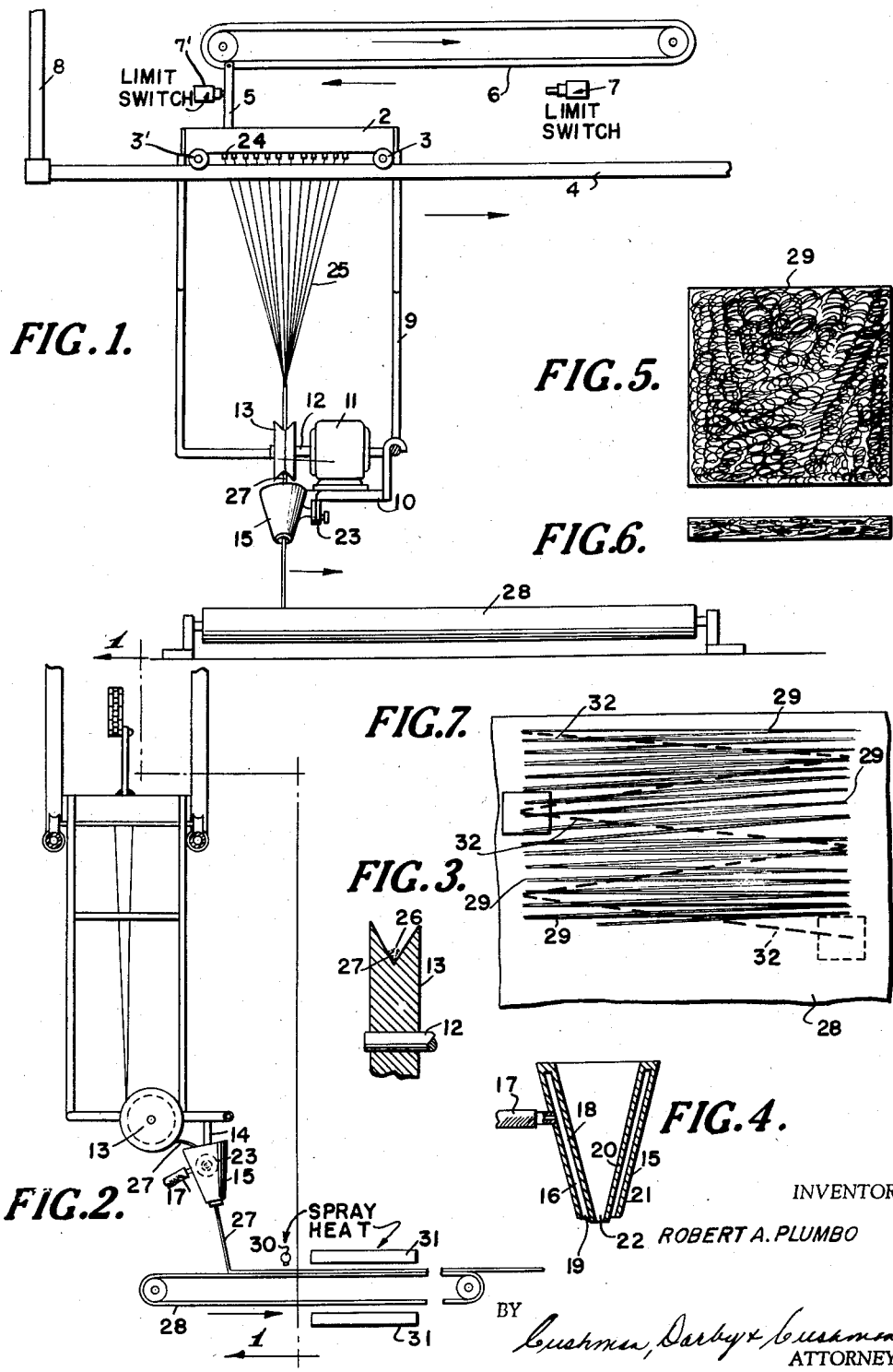

United States Patent Office 2,928,121
Patented Mar. 15, 1960

2,928,121

APPARATUS FOR FORMING GLASS FIBER MATS

Robert A. Plumbo, Millville, N.J., assignor to Friedrich & Dimmock, Incorporated, Millville, N.J., a corporation of Delaware Application May 19, 1955, Serial No. 509,618

2 Claims. (Cl. 18—8)

The present invention relates to means for producing an improved glass fibre product. This product comprises a single continuous strand containing a multiplicity of continuous attenuated glass filaments, the strand being laid down in a random but substantially uniform pattern to form a mat of any desired area and thickness. This mat may be impregnated with a suitable binder and may be used for many purposes notably as a reinforcement for sheets and bodies of plastic, of any desired shape and size.

It is an object of the present invention to provide means to prepare continuous attenuated filaments of glass and form a strand from the same by a simple method and with the aid of a minimum of equipment.

It is a further object of the present invention to provide means to prepare continuous attenuated filaments of glass and form the same into a strand without the need of employing high temperature combustion gases in the attenuating step.

It is an additional object of the invention to provide means to keep to a minimum the breakage of glass threads or fibres during the attenuation thereof into continuous filaments.

A still further object of the invention is to provide means to prepare attenuated continuous filaments from glass threads or fibres without the aid of a winding mechanism.

Another object of the invention is to provide means to prepare a continuous strand from a multiplicity of continuous attenuated glass filaments and in which the filaments of the strand have been given a desirable twist.

Also, it is an object of this invention to provide apparatus for producing a glass fibre mat structure of a desirable pattern which can be readily impregnated with a suitable binder or with a plastic so as to appropriately reinforce the mat structure for industrial purposes.

The foregoing, as well as other objects, will be more apparent as this description proceeds, especially when considered in connection with the accompanying drawings, wherein:

Figure 1 is a diagrammatic view of my improved process and apparatus.

Figure 2 is a view in end elevation of Figure 1.

Figure 3 is a detailed fragmentary view of the sheave member which is positively driven and acts to both attenuate and collect glass filaments into a strand.

Figure 4 is a detailed section of the fluid pressure applying device or blast.

Figure 5 is a top view of a mat of glass fibres produced by this invention which may be in the form of a single layer or a multiplicity of superposed layers.

Figure 6 is an end elevation of the mat shown in Figure 5.

Figure 7 is a diagrammatic view showing how the apparatus of the invention proceeds to form the mat of Figures 5 and 6.

Figure 8:
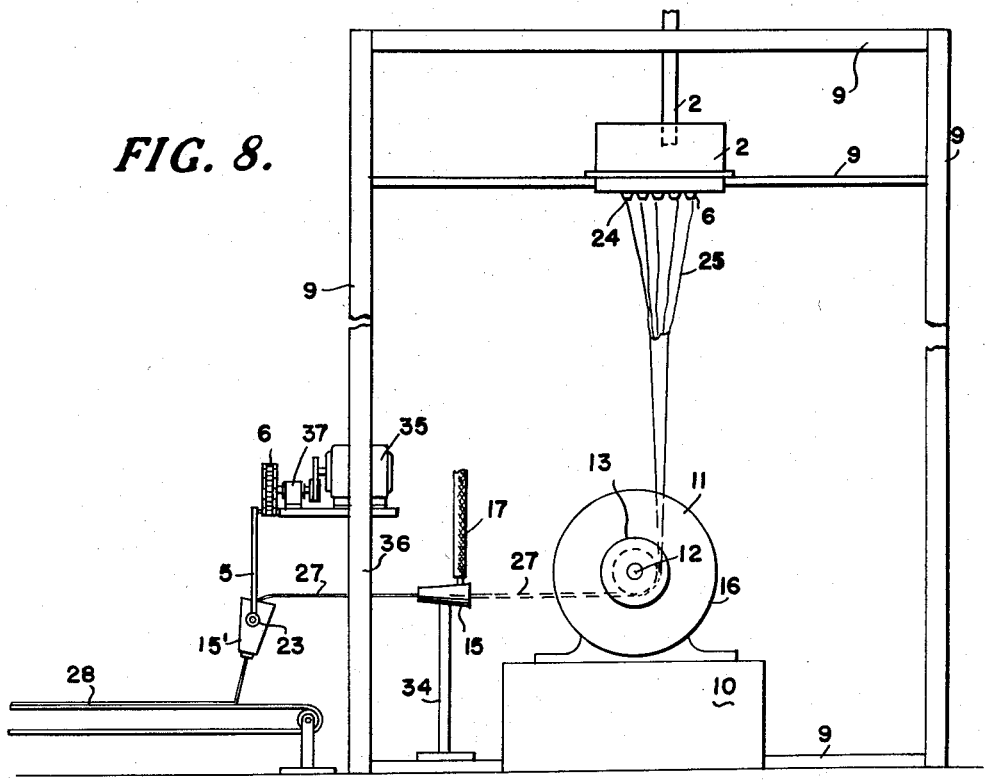
Figure 8 is a diagrammatic view of a modification.

Referring to Figure 1, the furnace or glass feeder is indicated at 2, the same being mounted upon the rollers 3 and 3' which, in turn, travel to and fro upon a suitable track 4. The glass feeder is reciprocated on said track by reason of its connection through the arm 5 to a traversing mechanism 6 which moves back and forth an adjustable controlled distance under the influence of the limit switches 7 and 7'. It will be noted that the track 4 is suitably carried in the bracket structure illustrated at 8.

Depending from the feeder or furnace 2 is a frame 9 which carries a bracket or shelf 10 upon which is mounted an electric motor 11 having the shaft 12 upon which is disposed a pulley or sheave 13, the same being rotated upon energization of the motor.

Also carried by hte frame 9 and suspended therefrom by a bracket 14 is an air guide 15, shown in detail in Figure 4. This air guide is substantially frusto-conical, as shown and double-walled, to provide a fluid passage 16 communicating with a source 17 of fluid such as air under pressure. If desired, the spaced walls forming the passage 16, or either of them may be provided with a continuous spiral groove 18 to impart a whirling motion to air discharged through the outlet at 19. It will be noted that the inner wall 20 extends beyond the outer wall 21 to assure that the air stream will exert the desired effect upon a strand moving through the air guide from the enlarged open end thereof and issuing through the reduced opening 22 therein.

This air guide 15 is adjustable to any desired angle and may then be fixed in such adjusted positions through any suitable adjusting means illustrated at 23 in Figure 1, and as illustrated in Figure 2, the air guide 15 is disposed at an angle to the vertical for a reason which will be later explained.

In the operation of this invention molten glass from the feeder 2 issues through the multiplicity of openings 24 therein as glass fibres or threads 25 which are carried about the sheave 13, being centered and collected in the groove thereof, as shown at 26 in Figure 3. In this manner, the rotation of the sheave 13 acts to attenuate the threads to filamentary form of a diameter up to about 0.0008 inch and, at the same time, the filaments are collected into a strand 27. It is an important feature of this invention that the strand remain continuous through the operation of the apparatus, and the same is now carried through the air guide 15. The air pressure exerted upon the strand appears to maintain the continuous attenuated filaments forming the strand and the strand itself under sufficient tension to assure that the rotation of the sheave will afford the desired attenuation, on the one hand, and collection of the resulting filaments into a strand on the other. This tension is created because the velocity of the air stream exerted upon the strand is much greater than the peripheral speed of rotation of the sheave. Thus, the sheave exerts a pulling action and the air guide cooperates to assure the proper tension. The delivery of the strand to the air guide is without interruption and always under the proper tension created by the air stream issuing from the outlet 19. The air guide delivers the strand 27 to and deposits it continuously upon a conventional conveyor 28. By reason of the angular disposition of the air guide 15, the continuous strand 27 is deposited on the conveyor 28 in a uniform but random pattern, as illustrated diagrammatically in exaggerated position at 29 in full lines in Figure 7 and as it is actually positioned in Figures 5 and 6. This is due apparently, to the combined effect of having the feeder 24, sheave 13 and air guide 15 constantly reciprocated, i.e., moving to and fro with respect to the conveyor 28 and the permission of a certain amount of slippage of the fibrous strand along the conveyor as the laps of the strand are continuously deposited.

The conveyor 28 moves in a direction at substantially right angles to the traversing or reciprocating movement of the attenuating mechanism, including the air guide 15, as indicated in Figures 1 and 2. The mat 29 may be removed from the conveyor without further treatment, but usually a suitable binder is sprayed upon the mat, as at 30, and the same is dried or set in any suitable manner, as by heating members 31.

Referring to Figure 7, it will be noted that the continuous strand 29 is laid down as shown in full lines in closely spaced relation (as more actually appears in Figures 5 and 6), and this effect is apparently obtained by adjusting the angle of the air guide 15 and the resultant slippage which occurs as the continuous strand is moved and deposited across, i.e., transversely with respect to movement of the conveyor 28. That is, the strand is laid down on the conveyor transversely thereof in one direction and then in the return direction, and the first length of strand acts as a barrier or stop for the return section and thus the superposing or spacing of the strands as they move to and fro across the conveyor and are deposited on the same can be controlled by the rate of movement of attenuating, collecting, delivery equipment 13–15 and the rate of movement of the conveyor 28, both in relation to each other and the angular position of the air guide 15 with relation to the vertical or the horizontal position of the mat receiving and forming means, such as the flat surface of the conveyor 28.

Referring further to Figure 7, the dotted-dash lines shown therein at 32 indicates what would result were it not for the slippage of the strand along the conveyor as the reciprocating delivery means or guide 15 moves to and fro across the same and the strand is deposited at an angle provided by fixing the adjustment of the air guide 15. The wide spacing of the continuous strand 32 is therefore merely shown for purposes of illustration.

The strand can be given a desirable twist, by using the groove structure 18 in the passageway 16 of the air guide 15 as above described. This causes the air stream to issue at 19 in a whirling or turbulent fashion which in turn exerts a twisting effect upon the filaments forming part of the strand issuing from the outlet 22 of the air guide.

The mat deposited upon the conveyor 28 comprises a continuous strand 27 formed of a multiplicity of continuous filaments 26, each filament having a diameter up to about 0.0008 inch and the continuous strand being arranged in uniform random pattern, as shown at 29.

Referring to Figure 6, there is illustrated a mat formed of more than one layer and this is produced by varying the angle of the air guide 15 through the adjusting means 23 and thereafter, with this angle fixed, the relative movement between the conveyor 28 and the filament and strand-forming instrumentalities will produce the laminated and built-up structure.

It will be understood that the threads issuing from the furnace or feeder 2 containing the molten glass are cooled rapidly during attenuation and are at substantially room temperature by the time they are attenuated as filaments and collected on the sheave 13.

Referring to Figure 8, the strand is moved substantially horizontally through the air guide 15 as shown and then through a second air guide 15' of similar construction which is held inclined by the adjusting means 23, and directs the continuous strand upon the moving conveyor 28. In this equipment only the second air guide 15' traverses the width of the conveyor to and fro, the attenuation apparatus and first air guide 15 being stationary.

Figure 9:
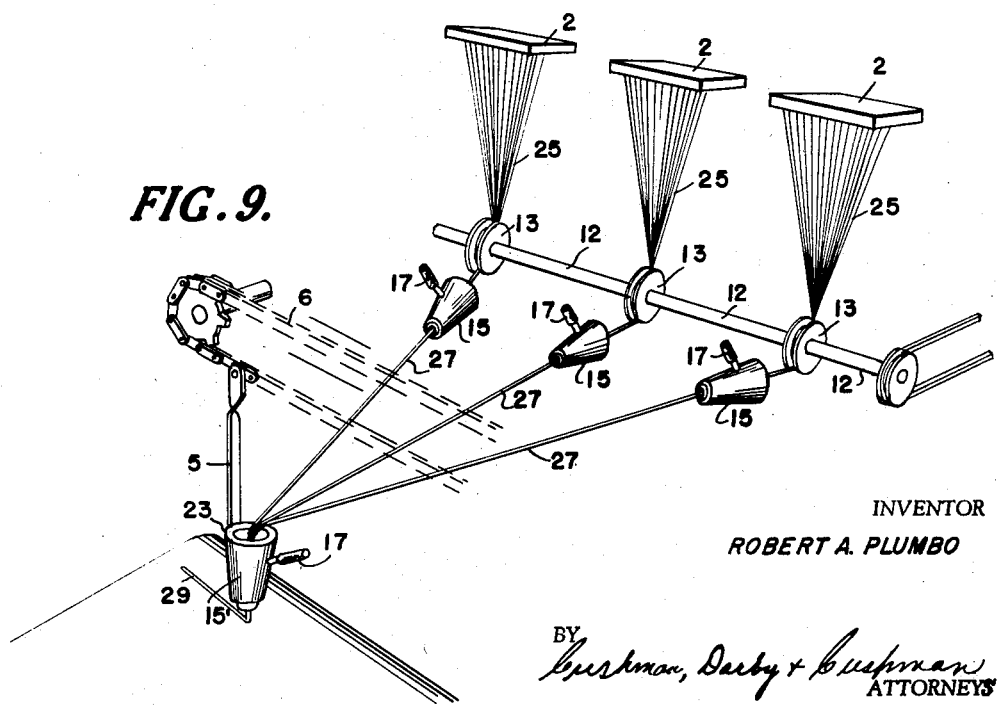
Figure 9 is a diagrammatic view of a further modification.

One of the advantages of the equipment of Figure 8 is illustrated in Figure 9, where a multiplicity of feeders 2 and associated sheaves 13 and air guides 15 are arranged side by side. The strands from the respective air guides 15 are collected in the air guide 15' to produce a strand 27' of any desired enlarged number of filaments without reciprocating any of the equipment, except the single air guide 15'. In this manner, a mat of the desired properties can be produced and from the manufacturing angle also, the desired poundage per period of operating time can be controlled within economic requirements.

While I have referred to filaments having generally a diameter up to about 0.0008 inch, larger diameter filaments may be formed, e.g., up to 0.004 for special products where a coarser filament is required as for instance in disposable air filters.

It will be observed that the molten glass threads are progressively attenuated and cooled to the desired filament diameter and as continuous attenuated filaments collected and deposited upon the moving conveyor in the form of laps diagrammatically illustrated at 29 in Figure 7, which laps because of the slippage above referred to, actually overlap in a desirable fashion to form a continuous mat structure of any desired area and thickness as shown in Figures 5 and 6.

Referring to Figure 8, the air guide 15 is mounted upon a suitable bracket 34 carried by the frame 9 in which the feeder 2 and attenuating mechanism are held in fixed position as shown. The air guide 15' is connected by the arm 5 to the traversing mechanism 6 which is otherwise identical with the construction shown in Figure 1, being suitably operated by a motor 35 carried in a bracket 36 on the frame 9 and driving the traverse mechanism 6 through a suitable speed reducing mechanism 37. The air guide 15' is connected to the arm 5 by suitable adjusting mechanism 23, whereby the angle of the guide 15' may be adjusted with respect to the vertical and to the surface of the conveyor 28 in the same manner as previously described in connection with the guide 15 in Figures 1 and 2.

What I claim is:

1. Apparatus for converting molten glass into attenuated strands of filaments, said apparatus comprising a vertical frame, filament forming means disposed at the top of said frame, said filament forming means having apertures in the bottom thereof through which filaments pass, a sheave over which said filaments pass, said sheave being disposed substantially in vertical alignment with and below said apertures, power means to drive said sheave, whereby said filaments are attenuated and gathered into a strand, and an air guide for removing said strand from said sheave after said strand has passed partially around said sheave the velocity of air passing through said air guide being substantially greater than the peripheral speed of said sheave and for supplying tension to said strand to hold said strand against said sheave, said air guide having a strand inlet positioned to receive the strand leaving the bottom of said sheave, and a strand outlet coaxial with said strand inlet through which the strand is directed away from said frame and said sheave and means to horizontally reciprocate said frame, said filament forming means, said sheave and said air guide as a unit.

2. Apparatus for converting molten glass into attenuated strands of filaments comprising, a stationary horizontal trackway, a substantially U-shaped vertical frame depending downwardly below said trackway, said frame being supported on said trackway for horizontal reciprocating movement, means for reciprocating said frame horizontally along said trackway, a molten glass feeder carried adjacent the upper end of said frame above said trackway having a plurality of filament forming outlets disposed along the bottom thereof, a rotary sheave supported adjacent the lower end of said frame around which said filaments pass, said sheave being disposed substantially in vertical alignment with and below said filament forming outlets, means for driving said sheave to attenuate and gather said filaments into a strand, and an air guide adjustably mounted to said frame having an inlet positioned adjacent said sheave for receiving said strand after the same has passed partially around said sheave, the velocity of air passing through said air guide being substantially greater than the peripheral speed of rotation of said sheave for supplying tension to said strand and to hold the same against said sheave, and a strand outlet coaxial with said strand inlet through which the strand is directed downwardly away from said frame and outwardly from said sheave.

References Cited in the file of this patent

UNITED STATES PATENTS

| | | |
|---|---|---|
| 2,067,251 | Taylor | Jan. 12, 1937 |
| 2,121,802 | Kleist et al. | June 28, 1938 |
| 2,206,058 | Slayter et al. | July 2, 1940 |
| 2,230,270 | Simpson | Feb. 4, 1941 |
| 2,491,889 | Bennett et al. | Dec. 20, 1949 |
| 2,518,744 | Barnard | Aug. 15, 1950 |
| 2,526,775 | Slayter et al. | Oct. 24, 1950 |
| 2,574,221 | Modigliani | Nov. 6, 1951 |
| 2,577,214 | Slayter | Dec. 4, 1951 |
| 2,610,893 | Collins et al. | Sept. 16, 1952 |
| 2,638,146 | Rounseville et al. | May 12, 1953 |
| 2,685,763 | Courtney et al. | Aug. 10, 1954 |
| 2,729,030 | Slayter | Jan. 3, 1956 |
| 2,736,676 | Frickert | Feb. 28, 1956 |
| 2,747,335 | Courtney et al. | May 29, 1956 |